United States Patent [19]

Lawler et al.

[11] Patent Number: 4,460,332

[45] Date of Patent: Jul. 17, 1984

[54] TEMPERATURE CONTROLLED OVEN WITH INTERNAL FILTER

[75] Inventors: Joseph A. Lawler, Flossmoor; Lawrence G. Viero, Oak Forest, both of Ill.

[73] Assignee: General Signal Corporation, Stamford, Conn.

[21] Appl. No.: 412,183

[22] Filed: Aug. 27, 1982

[51] Int. Cl.[3] ............................................ A21B 1/00

[52] U.S. Cl. ................................ 432/72; 126/19 R; 126/21 A; 219/402

[58] Field of Search ............ 432/72; 126/19 R, 21 A; 219/395, 402

[56] References Cited

U.S. PATENT DOCUMENTS

| | | | |
|---|---|---|---|
| 3,440,401 | 4/1969 | Dills | 126/19 R |
| 3,780,721 | 12/1973 | Durth | 126/21 A |
| 3,782,360 | 1/1974 | Brucken | 126/19 R |
| 3,807,383 | 4/1974 | Lawler | 126/21 A |
| 3,861,378 | 1/1975 | Rhoads et al. | 126/21 A |

FOREIGN PATENT DOCUMENTS

| | | | |
|---|---|---|---|
| 1452266 | 10/1976 | United Kingdom | 126/21 A |

*Primary Examiner*—John J. Camby

*Attorney, Agent, or Firm*—Burmeister, York, Palmatier, Hamby & Jones

[57] ABSTRACT

A temperature controlled oven for heat treating materials such as solid state electronic devices in which a housing forms an enclosure and has an opening for receiving a first sub assembly which forms a second enclosure with an aperture confronting the opening in the housing, and a second sub assembly is disposed within the first sub assembly and removable through the aperture of the first sub assembly to permit external cleaning, the second sub assembly having an opening confronting the opening of the housing and forming a closed air circulation path which contains a heater, blower, and filter for the purpose of maintaining the atmosphere in the second sub assembly relatively particle free.

9 Claims, 5 Drawing Figures

TEMPERATURE CONTROLLED OVEN WITH INTERNAL FILTER

The present invention relates to temperature controlled ovens, particularly ovens for heat treating materials.

DESCRIPTION OF THE PRIOR ART

Industry has placed increasingly stringent requirements on ovens for use in processing materials. This is particularly true for processing solid state electronic devices which require constant temperature in a contamination free atmosphere. The presence of contamination in the atmosphere will substantially decrease the yield obtained in processing integrated circuits, microprocessors and the like. Particles as small as one-half micron will reduce the yield of the production of microprocessors.

Ordinary commercial ovens are known to produce in excess of 500,000 particles of all sizes in a cubic foot of air. For the processing of solid state electronic devices, it is desired to reduce the particle level within a processing oven to not more than 100 particles of 0.5 microns or larger per cubic foot of air. Particle levels of this size have not been achieved by conventional processing ovens.

Contamination is generated within a heat processing oven as it processes the work load. Silicon wafers, for example, produce some contamination in themselves. The heating elements of the oven, and particularly ceramic discs used to support the heating elements, create contamination. The fiberglass insulation of the oven enclosure also produces some contamination. In addition, contamination enters the oven from the blower and the blower motor.

Prior efforts to construct heat treating ovens for such purposes have centered on making the ovens readily cleanable. Rounded corners have been provided and care has been exercised in the use and selection of materials within the oven.

The present invention has provided a heat treating oven capable of meeting the demands of industry, that is, operating with air having less than 100 particles of 0.5 microns or larger per cubic foot of air, by utilizing a first subassembly mounted within the opening of a housing and sealed to the shell of the housing to prevent the entry of contamination from the insulation or other factors within the housing, and further utilizing a second subassembly within the first subassembly to control the air flow within the oven chamber and to provide a filter in the air flow for the removal of particles immediately prior to entering the oven chamber.

The use of oven liners in the food industry has been well know, as indicated by U.S. Pat. No. 3,121,158 of Hurko entitled HOUSEHOLD COOKING OVENS AND METHODS OF CLEANING SAME, U.S. Pat. No. 3,385,280 of Schamhl entitled MOUNTING ARRANGEMENT FOR OVEN LINERS, U.S. Pat. No. 3,410 260 of Morgan entitled LINER SUPPORT USEABLE WITH OVEN ENCLOSURES OR THE LIKE, and U.S. Pat. No. 3,440,401 of Dills entitled THERMAL BREAKING MEANS FOR FRONT OF BAKING OVEN.

The use of ovens in which heat is brought to the products being processed, such as a horizontal flow of air through the oven, has also been known to the art as disclosed in U.S. Pat. No. 4,124,016 of Miller entitled OVENS FOR BAKING BREAD AND LIKE PRODUCTS, U.S. Pat. No. 3,780,721 of Durth entitled CIRCULATING-AIR OVEN WITH FILTER, and U.S. Pat. No. 4,224,743 of Erickson and Dornbush entitled FOOD DEHYDRATING MACHINE.

SUMMARY OF INVENTION

In accordance with the present invention there is provided an oven which has a housing forming a hollow enclosure, a first subassembly mounted within that enclosure and sealed to the housing, and a second subassembly mounted within the first subassembly which includes a filter. Further, the oven is provided with air circulation means including a blower and a heater mounted in a space between the first and second subassemblies and providing air circulation through the blower and heater to and through the air filter before passing through the oven chamber, the oven chamber being located in the second subassembly.

The purity of the air is greatly enhanced by the use of a glass micro fiber filter which is effective in removing in excess of 99% of particles having a cross-section of 0.5 micron and will function at elevated temperatures.

The first subassembly is effective to seal contamination located within the housing from the first and second subassemblies. Further, the second subassembly may be removed from the first subassembly through an opening and door closure for cleaning.

Further objects and advantages of the present invention will be apparent from the following description, reference being had to the accompanying drawings wherein a preferred embodiment of the present invention is set forth.

DETAILED DESCRIPTION

Figure 3:
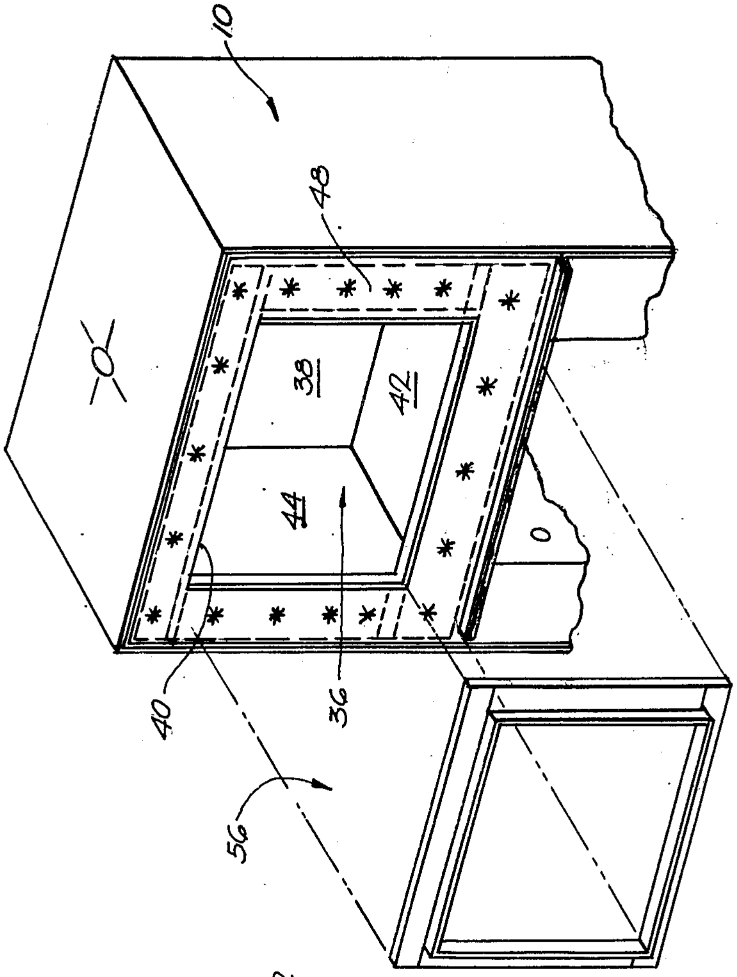
FIG. 3 is a fragmentary isometric view of the housing of the temperature controlled oven of FIGS. 1 and 2.
Figure 1:
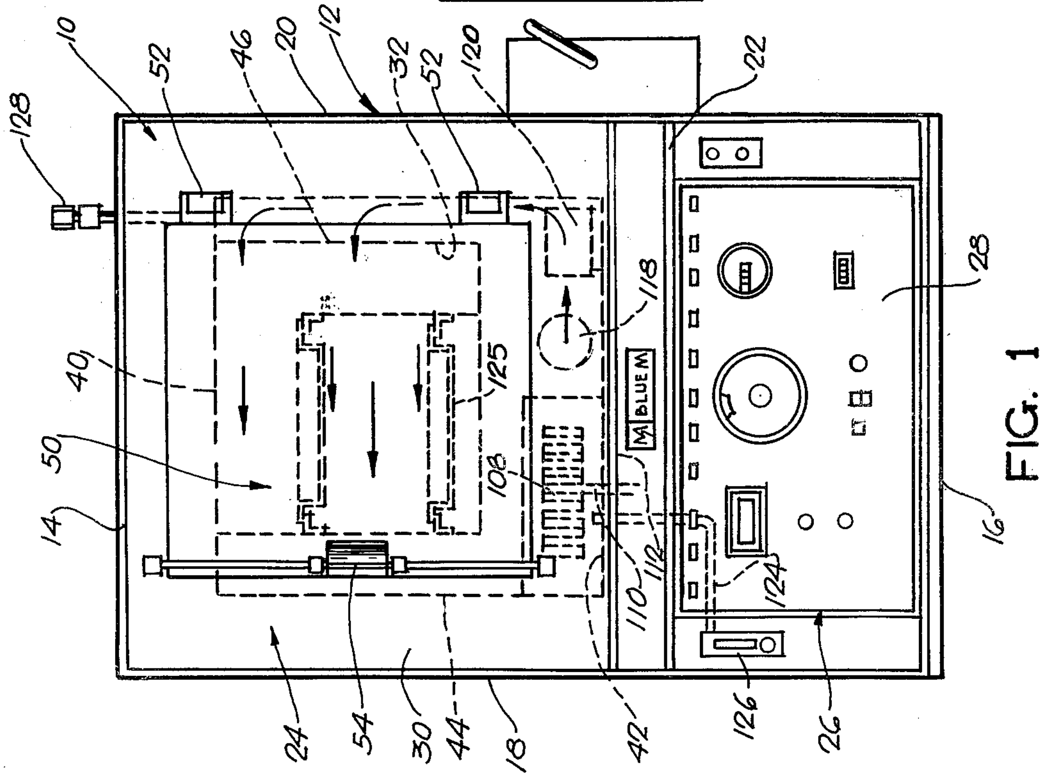
FIG. 1 is a front elevational view of a temperature controlled oven constructed in accordance with the present invention.

FIG. 1 illustrates the housing 10 for the temperature controlled oven, and this housing has an outer shell 12 forming a rectangular unit with a top wall 14, bottom wall 16, and side walls 18 and 20. In addition, the housing 10 has a partition 22 in the form of a flat wall disposed parallel to the top wall 14 and bottom wall 16, and the partition divides the housing 10 into an upper portion 24 and a lower portion 26. The upper portion 24 contains the oven, and the lower portion 26 contains a temperature control unit 28, such as that disclosed in copending application of Duward J. Bare and George Dixey, Ser. No. 408,760 filed Aug. 17, 1982 entitled TEMPERATURE CONTROLLED OVEN WITH MULTIPLE PRESET TEMPERATURES.

The upper portion 24 of the housing 10 is provided with a front wall 30 which has a rectangular opening 32 extending therein. The housing 10 has an enclosure unit 36 disposed within the upper portion 24 which has a back wall 38 parallel to and spaced from the back wall 34 of the housing. The enclosure unit also has a top wall 40 parallel to the top wall 14, a bottom 42 spaced from and parallel to the bottom wall 16, and side walls 44 and 46 parallel to and spaced from the side walls 18 and 20, respectively, of the housing. A layer 48 of thermal insulation extends between the walls of the enclosure unit 28 and the adjacent walls of the housing 10, and the insulation extends over the front wall 30 of the housing 10 except for the rectangular opening 32. A door 50 is mounted on the front wall 30 of the housing and extends over the opening 32 to seal the enclosure unit 36 from the ambient atmosphere and to form an air tight enclosure. The door 50 is mounted on hinges 52 to permit the door to be opened by means of a latch mechanism 54.

Figure 4:
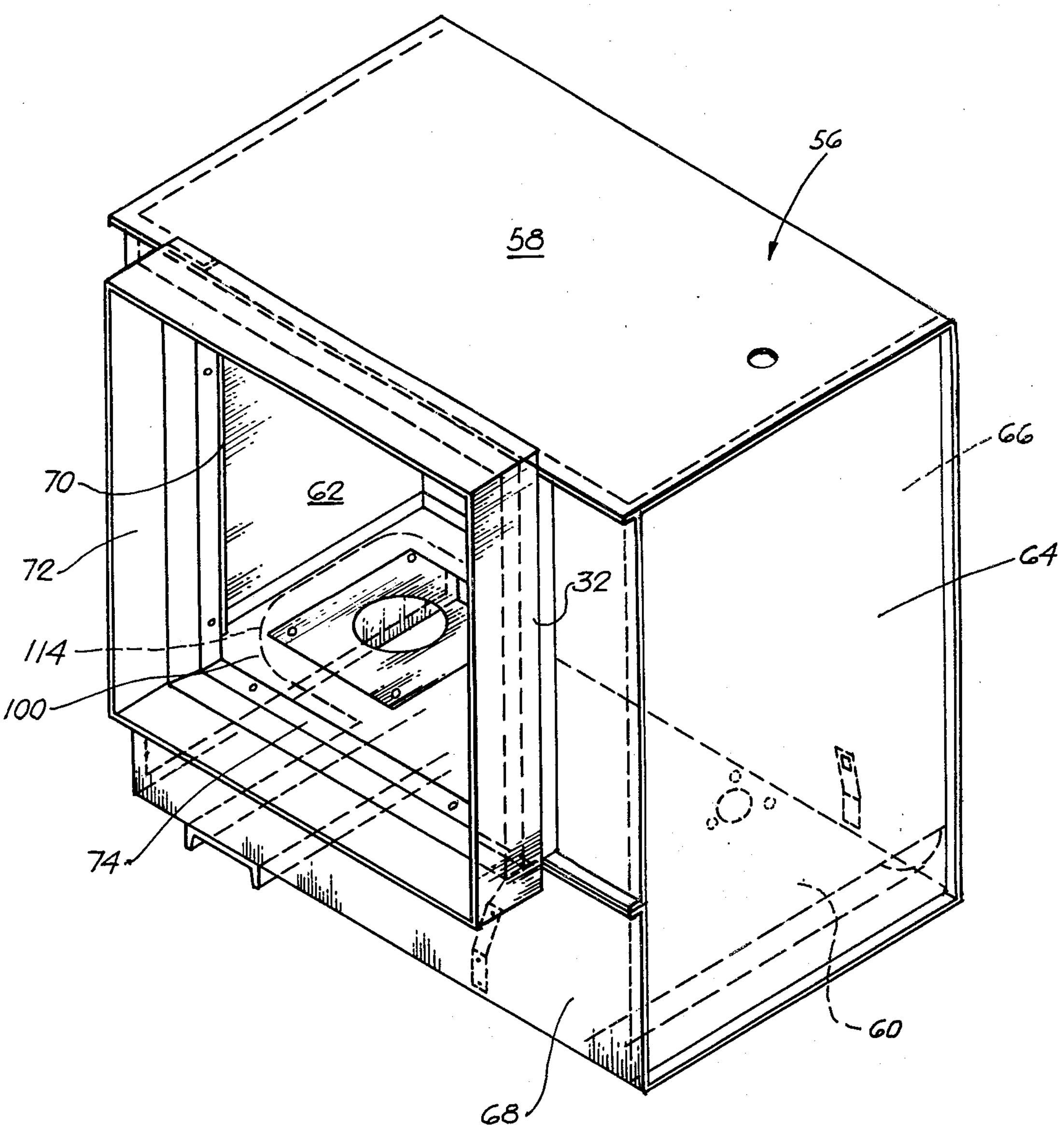
FIG. 4 is an isometric view of a first subassembly of the temperature controlled oven which is disposed immediately within the housing of FIG. 3.

A first subassembly 56 is illustrated in FIG. 4, and this subassembly 56 is disposed within the enclosure unit 36 of the housing 10. The first subassembly is rectangular in form and has a top wall 58, bottom wall 60, side walls 62 and 64. In addition, the first subassembly has a back wall 66 and a front wall 68. The first subassembly is disposed in slidable abutment with the walls of the enclosure unit 36.

The front wall 68 of the first subassembly is provided with a rectangular aperture 70, and a rectangular frame 72 extends outwardly from the front wall 68 about the aperture 70. The frame 72 has cross-sectional dimensions slightly greater than the cross-sectional dimensions of the aperture 70, thus forming a lip 74 in the plane of the front wall 68 within the frame 72. Except for the aperture 70, the first subassembly is air tight.

Figure 2:
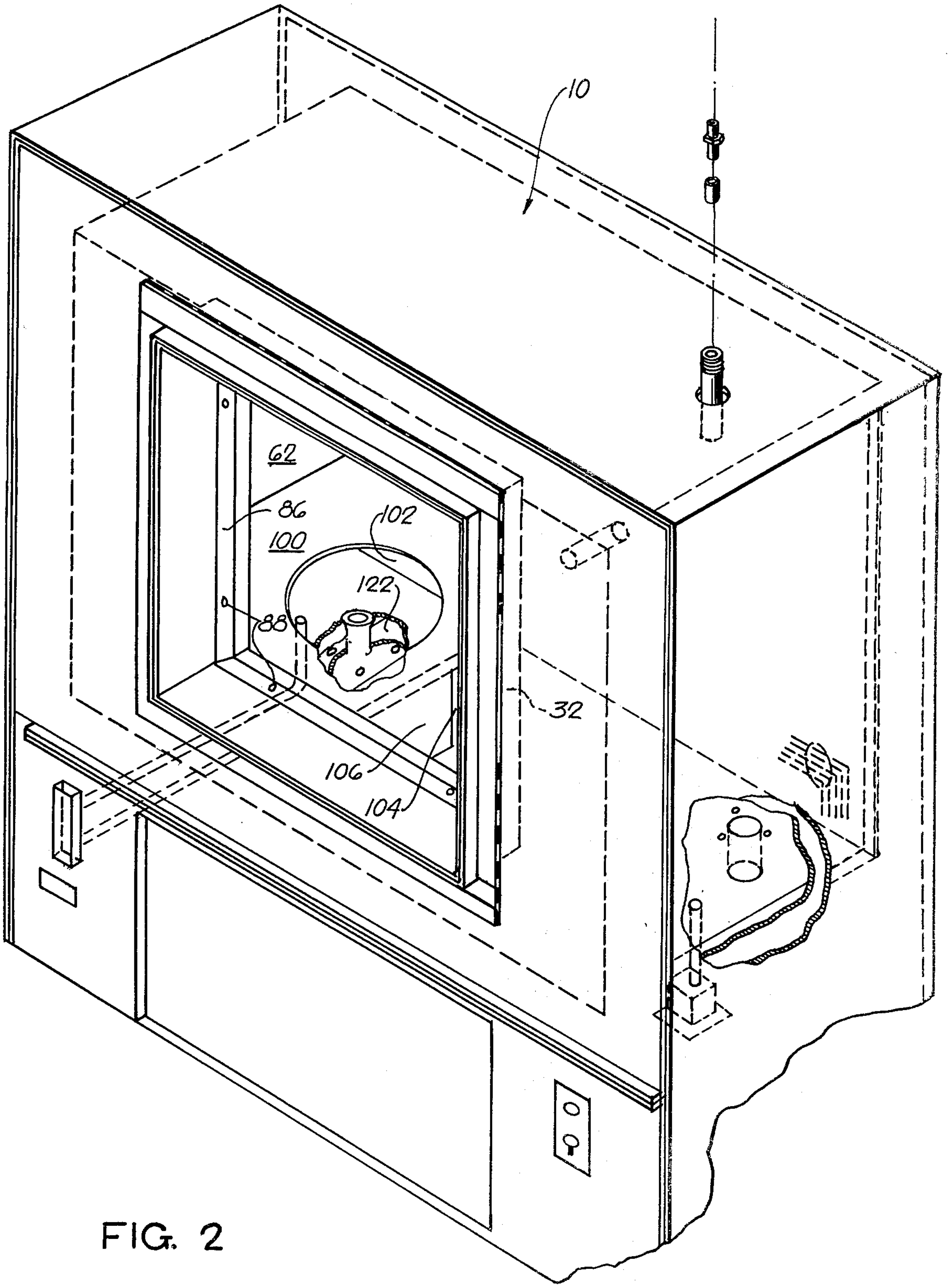
FIG. 2 is an isometric view of the oven of FIG. 1, portions of the oven having been omitted for purposes of clarity.
Figure 5:
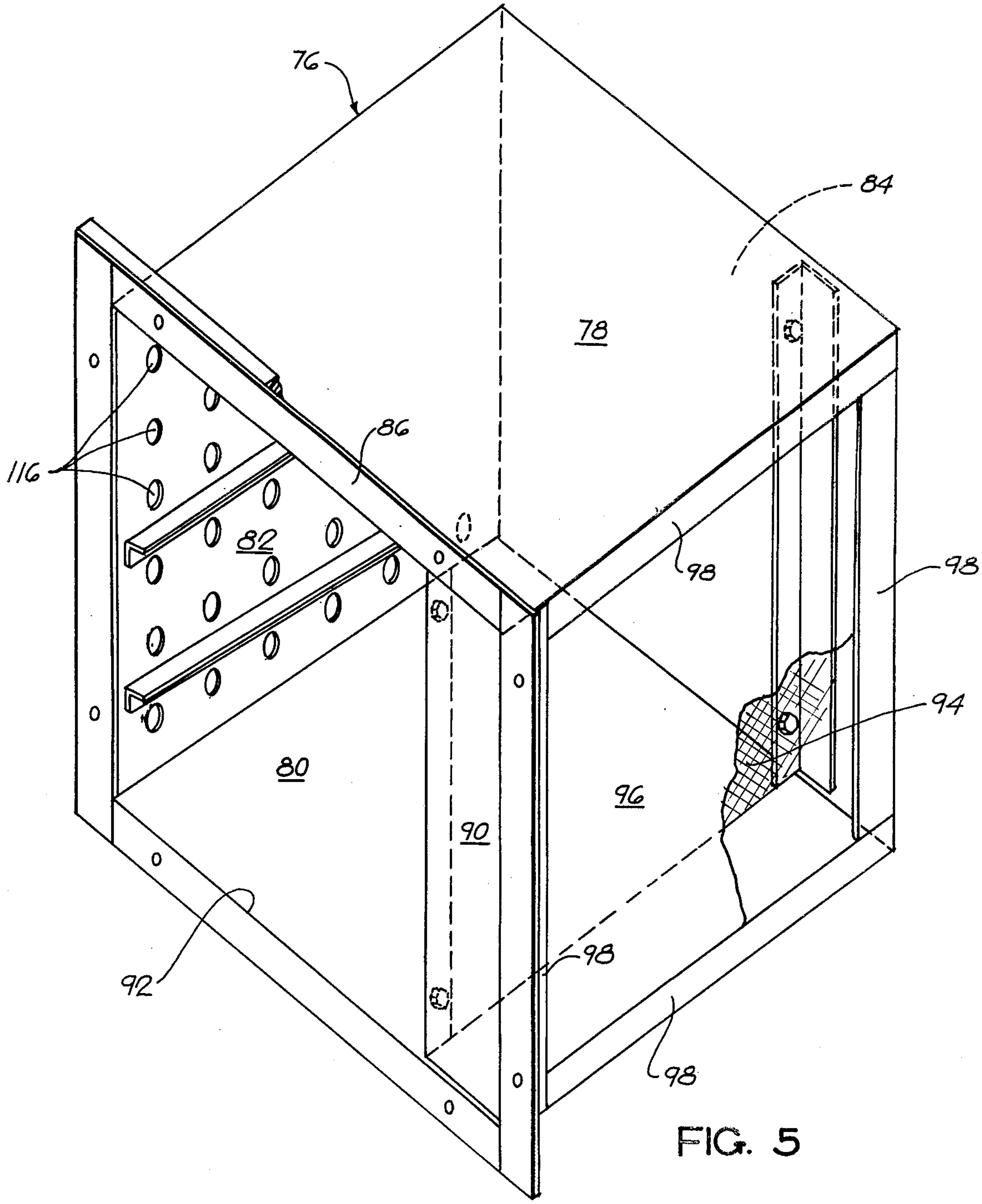
FIG. 5 is an isometric view of a second subassembly which is disposed within the first subassembly of FIG. 4 of the temperature controlled oven.

A second subassembly 76, illustrated in FIG. 5, is disposed within the first subassembly 56. The second subassembly 76 is also rectangular in form and has a top wall 78, a bottom wall 80, a left side wall 82, and a back wall 84. The first subassembly 56 is insertable within the enclosure unit 36, and the second subassembly 76 is insertable through the aperture 70 in the first subassembly, the back wall 84 being disposed in abutment with the back wall 66 of the first subassembly. The second subassembly is provided with flanges in the form of a flat frame 86 which extend outwardly from the top 78, left side 82, and bottom wall 80, thereby forming a mounting bracket for attachment to the lip 74 by means of bolts 88, or the like, as illustrated in FIG. 2.

The second subassembly 76 is provided with a front panel 90 which extends between the right edge of the top wall 78 and the right edge of the bottom wall 80. The front panel 90, together with the top wall 78, left side wall 82, and bottom wall 80 form a rectangular opening 92 which is aligned with the aperture 70 in the first subassembly. A stainless steel wire mesh 94, illustrated in FIG. 5, is attached to the panel 90 at the edge of the opening 92 and extends parallel to the left wall 82 to the back wall 84, the wire mesh 94 also extending between the top wall 78 and bottom wall 80 of the second subassembly. A mass of filter material 96 extends from the mesh 94 to a plane formed by the edge of the panel 90 opposite the opening 92 and the edges of the top wall 78 and bottom wall 80 opposite the left side wall 82, the panel 92, top wall 78, bottom wall 80, and back wall 84 being provided with inwardly extending flanges 98 to retain the filter mass 96 in position. The filter mass is constructed of closely packed glass micro fibers and has a thickness of approximately 3 inches. As constructed, the filter will remove over 99.9% of the particles in the air having cross-sections of at least 0.3 microns. The filter should be sufficiently thick and close enough packed to at least remove 99% of the particles in the air having cross-sections of at least 0.5 microns to be effective as a filter.

The first subassembly 56 is provided with a panel 100 which extends parallel to the bottom wall 60 and spaced therefrom between the front wall 68, back wall 66, and left side wall 62. The panel 100 has a circular opening 102 disposed adjacent to the left side wall 62. A second panel 104 extends normally from the edge of the panel 100 opposite the wall 62, and extends between the front wall 68 and back wall 66. The second panel 104 also extends from the first panel 100 to the bottom wall 60 and is provided with a second opening 106. The panels 100 and 104 form a compartment for a squirrel cage rotor 108, the rotor being mounted on a shaft 110 extending downwardly through the bottom wall 42 of the enclosure unit to a motor 112, as illustrated in FIG. 1. A squirrel cage scroll 114 surrounds the rotor, thus providing an air flow through the opening 102 in the panel 100 and out through the second opening 106 in the second panel 104. To reduce contamination, both the squirrel cage rotor 108 and shaft 110 are constructed of stainless steel.

The bottom wall 80 of the second subassembly 76 abuts the first panel 100, but is spaced from the side wall 62 of the first subassembly 56 to avoid covering the opening 102. Further, the left side wall 82 of the second subassembly 76 is provided with a plurality of perforations 116. Hence, operation of the motor 112 results in the flow of air through the rotor 108, out of the second opening 106, through the region between the bottom wall 60 of the first subassembly and the bottom wall 80 of the second subassembly to pass between the flange 98 at the edge of the bottom wall 80 and the confronting side wall 64 of the first subassembly to the region between the filter mass 96 and the side wall 64. The flow of air then passes through the filter mass 96, the mesh 94, and flows horizontally across the interior of the second subassembly to the perforated left side wall 82. Thence the air flow continues through the perforations 116 in the side wall 82 and downwardly in the region between the side wall 82 of the second subassembly and the side wall 62 of the first subassembly to reenter the opening 102 in the panel 100, and to repeat the cycle. In this manner, all of the air passing through the interior of the second subassembly is filtered each time it passes through the blower and before it reenters the region of the second subassembly.

A heater 118, which is preferably an electrical resistance heater, is also mounted in the region between the bottom wall 60 of the first subassembly and the bottom wall 80 of the second subassembly adjacent to the second panel 104. A cooling coil 120, which is connected to a source of chilled water, is also mounted adjacent to the heater 118 in the region between the bottom walls 60 and 80 of the first and second subassemblies. The heater 118 and the cooling coil 120 are utilized to adjust the temperature of the air flow within the oven to the desired value, that temperature being controlled by the temperature control unit 28. As a result, the air flow through the chamber of the second subassembly 76 is filtered between the time it passes through the blower, the heater and the cooler before it reenters the chamber.

The first subassembly is completely gas tight, and all seams are welded. When the door 50 is closed and latched, the first subassembly is completely isolated from the ambient surroundings. The second subassembly 76 also forms an air tight seal about the aperture 70 of the first subassembly 56. Further, the seams between the bottom wall 80 and back wall 84 and between the back wall 84 and top 78 are welded air tight construction. In this manner, the flow of air through the second subassembly is limited to a horizontal flow through the filter mass 96, mesh 94, and perforations 116.

The motor shaft 110 to the rotor 108 passes through a bearing 122 provided to seal the shaft and prevent contamination from entering into the first subassembly along the shaft bearing. Any contamination which enters through the rotor shaft, or results from particles becoming detached from the rotor 108, or the heater 118, or the cooling coil 120, must pass through the filter mass 96 before reentering the chamber of the second subassembly 76.

The second subassembly 76 may readily be removed from the first subassembly 56 for external cleaning and for replacement of the filter mass 96. The use of stainless steel and welded seams reduces areas in which contamination can lodge within the first and second subassemblies, thus reducing the likelihood of contamination. The second subassembly is provided with shelves 125, as illustrated in FIG. 1, for the work load, and these may also be removed for processing.

The oven may be operated using totally recirculated air or by introducing nitrogen or a clean dry air supply through a supply line 124 leading to the rotor 108 of the blower. A manually operable control valve 126 on the front panel permits control of the amount of air introduced into the oven. A pressure relief valve 128 located at the top of the housing 10 limits the pressure within the first subassembly 56.

The oven described above is capable of providing Class 100, or better, first air, thus permitting the processing of work loads which require clean air, such as delicate electronic components. Air borne impurities are effectively minimized in the temperature controlled oven described herein, thus permitting the drying of silicone wafers used in solid state electronics without the introduction of impurities and with significantly increased yield.

Those skilled in the art will readily devise many applications for the temperature controlled oven described herein and modifications within the intended scope of this invention. It is therefore intended that the scope of the invention be not limited by the foregoing specification, but rather only by the appended claims.

The invention claimed is:

1. A temperature controlled oven for heat treating work in process comprising, in combination:

a housing having a plurality of walls forming a hollow first enclosure and an opening in one of said walls giving access to the interior of said enclosure, a layer of heat insulating material disposed within and adjacent to the walls of the housing defining a cavity within the housing, a first subassembly disposed within the cavity of the housing, said first subassembly having a plurality of walls sealed together to prevent air leakage and forming a second enclosure, said first subassembly having an aperture in one of the walls confronting the opening in the housing, a second subassembly disposed within the first subassembly and being removable through the aperture of the first subassembly, said second subassembly having a plurality of walls defining a chamber therein, said second subassembly being air permeable on a first side and a second side opposite the first side, said second subassembly having an opening in a wall disposed between the air permeable sides aligned with the aperture in the second subassembly, said second subassembly being sealed about the opening thereof on the first subassembly against the leakage of air, a filter mounted on the first air permeable side of the second subassembly, air circulation means including a blower and a heater within the first subassembly exterior of the second subassembly, said air circulations means translating a flow of air along a path extending through the blower, the heater, the first air permeable side of the second subassembly, the filter, the chamber of the second subassembly, and the second air permeable side of the second subassembly.

and means for sealing the aperture of the first subassembly from the ambient atmosphere.

2. A temperature controlled oven comprising the combination of claim 1 wherein the filter comprises a mass of finely packed glass micro fibers of a density and thickness sufficient to filter from a flow of air at least 99% of the particles having cross-sections greater than 0.5 microns.

3. A temperature controlled oven comprising the combination of claim 1 wherein the layer of heat insulating material disposed within the housing consists of fiberglass.

4. A temperature controlled oven comprising the combination of claim 1 wherein the opening in the housing is rectangular, the aperture of the first subassembly is rectangular, and the opening of the second subassembly is rectangular, the opening of the second subassembly being sealed about the aperture of the first subassembly, and the aperture of the first subassembly having a rectangular frame extending through the opening of the housing, and the means for sealing the aperture of the first subassembly from the ambient surroundings comprises a door removably sealed on the frame.

5. A temperature controlled oven comprising the combination of claim 1 wherein the hollow enclosure within the housing is rectangular, the walls of the first subassembly and the walls of the second subassembly form rectangular configurations with a second wall disposed between the air permeable walls of the second subassembly being disposed parallel to and spaced from a wall of the first subassembly, the blower and heater being mounted in the space between said second wall of the second subassembly and the wall of the first subassembly.

6. A temperature controlled oven comprising the combination of claim 1 wherein the blower is a squirrel cage blower provided with an electric motor, the squirrel cage being located between the first and second subassemblies and the motor being located exterior of the second subassembly in the housing, the shaft of the motor being sealed to the second subassembly.

7. A temperature controlled oven comprising the combination of claim 6 in combination with means for introducing a gas into the oven chamber comprising a tube extending from the housing into the first subassembly, said tube confronting the squirrel cage blower and being sealed on the first subassembly.

8. A temperature controlled oven comprising the combination of claim 6 wherein the first and second subassemblies are constructed of stainless steel, the motor shaft and rotor are constructed of stainless steel.

9. A temperature controlled oven comprising the combination of claim 4 wherein the cavity of the housing is quadrangular and have five flat sides, the sixth side forming the opening, the first subassembly is quadrangular and disposed within the cavity of the housing said first subassembly having five flat sides contiguous to the sides of the cavity, the rectangular aperture of the first subassembly being disposed in a sixth rectangular side and being smaller than the sixth side, the second subassembly being quadrangular in shape and having six flat sides, the cross sectional dimention of the second subassembly taken parallel to two of the sides thereof being smaller than the rectangular opening of the first subassembly, and the opening of the second subassembly being disposed in one of the parallel sides of the second subassembly.

* * * * *